United States Patent [19]
Ohga

[11] Patent Number: 5,305,301
[45] Date of Patent: Apr. 19, 1994

[54] OPTICALLY READABLE RECORD CARRIERS

[75] Inventor: Norio Ohga, Tokyo, Japan

[73] Assignee: Sony Corporation, Tokyo, Japan

[21] Appl. No.: 890,316

[22] Filed: May 22, 1992

Related U.S. Application Data

[63] Continuation of Ser. No. 395,219, Aug. 17, 1989, abandoned, which is a continuation of Ser. No. 693,303, Jan. 23, 1985, abandoned, which is a continuation of Ser. No. 363,532, Mar. 30, 1982, abandoned.

[30] Foreign Application Priority Data

Apr. 10, 1981 [JP] Japan .................. 56-54678

[51] Int. Cl.$^5$ ............................. G11B 7/26
[52] U.S. Cl. .................. 369/275.3; 369/283; 369/286; 346/135.1
[58] Field of Search ............ 369/275, 283-285, 369/275.1-275.4, 286, 283, 275.5, 284; 346/76 L, 135.1; 358/342; 353/120; D14/1

[56] References Cited

U.S. PATENT DOCUMENTS

| | | |
|---|---|---|
| D. 55,053 | 5/1920 | Kazanjian . |
| 2,142,591 | 1/1939 | Ross .................. 369/272 |
| 4,020,278 | 4/1977 | Carré et al. .......... 369/283 |
| 4,074,282 | 2/1978 | Balas, Jr. et al. ...... 369/275 X |
| 4,105,319 | 8/1978 | Wells et al. .......... 353/120 |
| 4,138,705 | 2/1979 | Stave et al. .......... 360/97 |
| 4,258,986 | 3/1981 | Crandall .............. 353/26 R |
| 4,264,911 | 4/1981 | Wilkinson ............ 346/135.1 |
| 4,304,806 | 12/1981 | Anderson et al. ...... 346/76 L X |
| 4,334,233 | 6/1982 | Murakami ............. 346/135.1 |
| 4,340,959 | 7/1982 | Levin ................. 369/275 |
| 4,357,616 | 11/1982 | Terao et al. ......... 346/76 L |
| 4,360,820 | 11/1982 | Forster et al. ....... 369/284 |
| 4,363,844 | 12/1982 | Lewis et al. ......... 369/275 X |
| 4,432,002 | 2/1984 | Ando ................. 346/76 L |

FOREIGN PATENT DOCUMENTS

| | | | |
|---|---|---|---|
| 1008925 | 5/1957 | Fed. Rep. of Germany | 369/274 |
| 0573025 | 2/1958 | Italy | 369/274 |
| 0025242 | 3/1981 | Japan | 369/275 |
| 0134334 | 10/1981 | Japan | 360/135 |
| 0574557 | 1/1946 | United Kingdom | 369/275 |

OTHER PUBLICATIONS

IBM Technical Disclosure Bulletin, vol. 22, No. 3, Aug. 1979/Bruce et al; "Video Disk With Updating Feature".

Primary Examiner—Paul M. Dzierzynski
Assistant Examiner—Kim-Kwok Chu
Attorney, Agent, or Firm—Lewis H. Eslinger; Jay H. Maioli

[57] ABSTRACT

A record carrier has a spiral track in which sound and/or video information is stored formed on a transparent substrate and covered by a reflecting layer of metallic material for reflecting a reading beam. The metallic layer does not extend to the inner and/or the outer edge portion of the substrate and is covered by a protective layer. The protective layer is extended to the inner and/or the outer edge portion of the substrate so as to seal the metallic layer for preventing oxidation thereof.

5 Claims, 1 Drawing Sheet

OPTICALLY READABLE RECORD CARRIERS

This is a continuation of application Ser. No. 07/395,219 filed Aug. 17, 1989 abandoned on Jul. 21, 1992; which is a continuation of application Ser. No. 06/693,303, filed in Jan. 23, 1985, abandoned on Sep. 14, 1989; which is a continuation of application Ser. No. 06/363,532, filed Mar. 30, 1982, abandoned on Mar. 11, 1985.

BACKGROUND OF THE INVENTION

1. Field of the Invention

This invention relates to optically readable record carriers on which information is stored in an optically readable structure.

2. Description of the Prior Art

Such a record carrier, in the shape for example of a disc, can be read optically by focussing a reading beam of radiation such as visible or infrared light onto the optical structure, and moving the radiation spot thus formed and a spiral information track relative to each other. This results in the reading beam being modulated in accordance with the sequence of areas and intermediate areas in the spiral information track. The modulated reading beam is then converted by a radiation-sensitive detector into an electrical signal from which for example audio and/or video information can be derived.

Such a record carrier conventionally comprises a transparent substrate having pits or bumps forming the spiral information track thereon, a metallic layer covering the surface of the substrate including the pits or bumps, and a protective layer covering the metallic layer for protecting the metallic layer. In this case, a reading beam is projected from underneath the substrate onto the spiral information track, where it is reflected by the metallic layer. More particularly, the metallic layer forming the reflective layer is formed over the whole of that surface of the substrate on which information is stored. In practice, aluminum is used for the metallic layer which is formed or applied by a normal evaporation or sputtering process. Then, a protective material, such as a resin curable by ultra-violet light (hereinafter referred to a U.V. resin), is applied onto the metallic layer and cured by ultra-violet light, in order to protect the metallic layer from scratches, abrasion and wear.

However, since the metallic layer extends to the outer-most and inner-most portions of the substrate, that is the edge portions of the record carrier, the edge portions of the metallic layer are exposed to air, so that it becomes oxidized, with a consequent tendency to strip off from the substrate and/or the protective layer. Also, if such stripping-off occurs, air further invades the stripped-off region, so that the oxidation and the stripping-off progress further across the record carrier. Of course, if a clear metallic layer is not maintained on the information area, correct reproduction is not obtained by the reading beam. Moreover, aluminum does not have very good compatibility with the resin and this tends to increase the stripping-off.

The conventional record carrier generally has a paper label on which information such as music titles and details of artists and composers is printed. If such a paper label is attached to the protective layer by adhesive material, the label stresses the substrate, so that there is a tendency to warp the record carrier.

OBJECTS AND SUMMARY OF THE INVENTION

It is an object of the present invention to provide an improved record carrier on which information to be read by a light beam has been recorded.

It is another object of the present invention to provide a record carrier in which a metallic layer for reflecting a read beam is not damaged by oxidation.

It is another object of the present invention to provide a record carrier which is free from stripping-off of a metallic layer, and in which a metallic layer is certainly protected by a protective layer.

It is another object of the present invention to provide a record carrier which is free from stress, and on which a label is simply formed.

According to the present invention there is provided an optically readable record carrier comprising a disc-like substrate made of transparent material and having a central apertures, an information track formed on one surface of to substrate other than the outer edge portion of to surface, a metallic layer formed on the information track for reflecting a reading beam, and a protective layer formed on the metallic layer to protect the metallic layer, wherein the metallic layer is not formed on the outer edge portion of the substrate, and the protective layer covers the metallic layer and the outer edge portion of the substrate, so that the metallic layer is not exposed to air and is protected from oxidation.

The above, and other objects, features and advantages of this invention will be apparent from the following detailed description of illustrative embodiments which is to be red in connection with the accompanying drawings.

DESCRIPTION OF THE PREFERRED EMBODIMENTS

Figure 1:
FIG. 1 is a sectional view of a replica disc which is to be used to form an embodiment of the invention.

As shown in FIG. 1, a disc-like substrate 1, or so-called replica disc is made of a transparent plastics resin, such as acrylic resin, and an information signal track 2, carrying audio and/or video information in digital form, or some other digital signal, is formed as pits on an upper surface 1a of the substrate 1. The information signal track 2 is a spiral having a large number of quasi-concentric turns. Each turn comprises a crenellated structure the dimensions of which are dependent on the recorded information. Thus, the spacings between the raised portions or merlons are different and so are their lengths. Both spacings and lengths are determined by the information stored in the information signal track 2. The heights of the merlons are equal to one another and in the case of a record carrier to be read by reflection are preferably equal to one quarter of the wavelength of the radiation by means of which the record carrier is to be read. Preferably the upper surface of the merlons is coplanar with the upper surface of the spaces.

Such a replica disc is obtained by the following steps. A metallic layer is coated on an information surface of a master plate by electrotyping in order to form a mother plate. Next a metallic layer is formed on an information surface formed on the mother plate by electrotyping to obtain a stamper. The stamper has a reinforcement layer and it is set in a metal die for moulding, the replica disc being obtained therefrom by an injection moulding technique or a compression moulding technique.

As shown in FIG. 1, the substrate 1 has a central aperture 3 to be engaged by a spindle of a disc player, and inner and outer edge portions or surfaces 4 and 5 which are coplanar with each other, but do not have an information signal track formed thereon.

Figure 2:
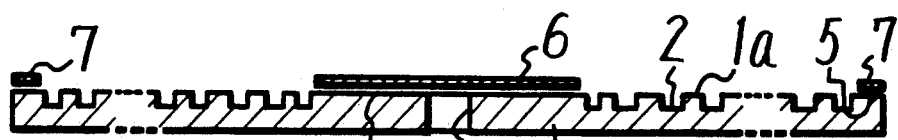
FIG. 2 is a sectional view of the replica disc with masks.
Figure 3:
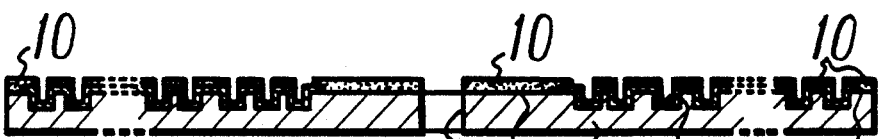
FIG. 3 is a sectional view of the replica disc with a metallic layer.

As shown in FIG. 2, a circular mask 6 and an annular mask 7 are placed on the inner and outer edge portions or surfaces 4 and 5 respectively on which no information signal track is formed, and a metallic, for example an aluminum, layer 8 is formed as a reflective layer on the upper surface 1a of the substrate 1 by a sputtering or evaporation process. No aluminum is deposited on the inner and outer edge portions or surfaces 4 and 5 due to the masks 6 and 7, so the inner and outer edge portions or surfaces 4 and 5 are not provided with a metallic layer. The resulting metallic layer 8 is shown in FIG. 3.

Figure 4:
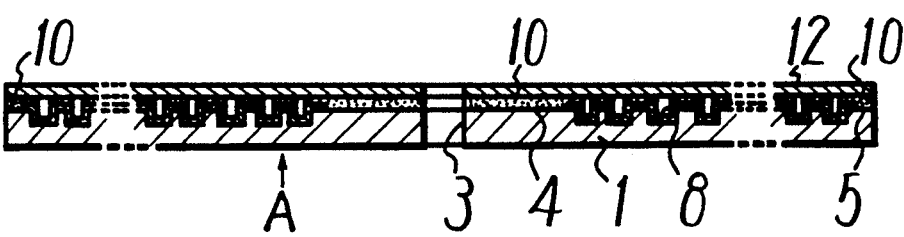
FIG. 4 is a sectional view of a record carrier forming an embodiment of the invention.
Figure 5:
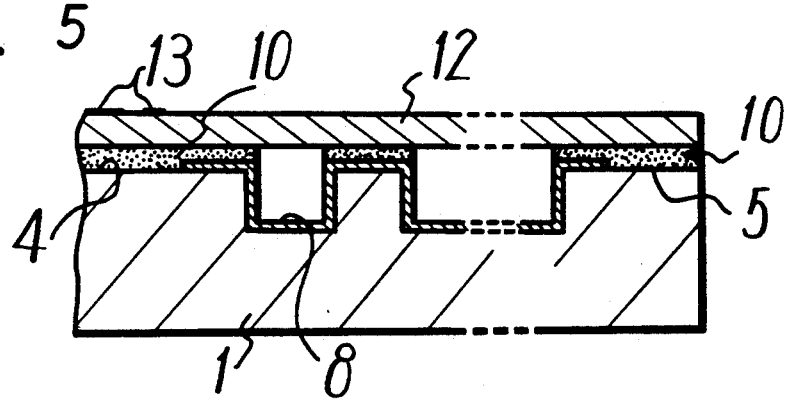
FIG. 5 is an enlarged sectional view of part of the record carrier of FIG. 4.

After removing the masks 6 and 7, an adhesive 10 is coated on the metallic layer 8 and the inner and outer edge portions or surfaces 4 and 5, and then as shown in FIG. 4, a protective layer 12 in the form of a thin film is added so as to protect the metallic layer 8 and the inner and outer edge portions or surfaces 4 and 5. The detailed structure is shown in FIG. 5. A paper or plastics film can be used as the protective layer 12, so that it is possible to print some indication 13 such as music titles and details of artists and composers relating to the information signal. Thus, the protective layer 12 can serve not only as a protective layer for the metallic layer 8 but also as a record label. On reading the record carrier, a reading beam is projected thereon from the under-side of the substrate 1 as shown by an arrow A in FIG. 4.

Figure 6:
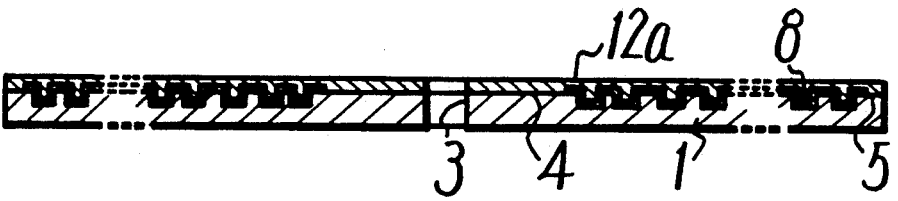
FIG. 6 is a sectional view of a record carrier forming another embodiment of the invention.

A second embodiment is shown in FIG. 6. In this embodiment, U.V. resin is used for a protective layer 12a. Thus, after the metallic layer 8 is formed on the upper surface of the substrate 1, other than the inner and outer edge portions or surfaces 4 and 5, U.V. resin is applied not only to the metallic layer 8 but also to the inner and outer edge portions or surfaces 4 and 5, and is then cured by ultra-violet light. Therefore, the protective layer 12a is formed covering the whole upper surface of the substrate 1. In this case, no adhesive layer is applied to the substrate 1. It is possible to print information, relating to the recorded information signal, on the protective layer 12a by silk screen printing.

Moreover, if ink is applied to the metallic layer 8 and to the inner and outer edge portions or surfaces 4 and 5 of the substrate 1 by a tampo print technique, it is possible to form both label information and a protective layer.

As described above, in the embodiments, the metallic layer is wholly covered by the protective layer, and even the edges are not exposed to air, so oxidation is avoided. This means that the metallic layer is protected for a long time, and the information signal recorded on the record carrier is preserved without deterioration.

Although illustrative embodiments of the invention have been described in detail with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of manufacturing an optically readable, rotatable, record carrier for reading by a focussed beam of radiation, comprising the steps of:

forming by molding a disc-shaped substrate having a central aperture;

masking inner and outer edge portions of the disc-shaped substrate, so that no information signal track can be formed by coating at said portions;

coating a metallic layer onto the masked, disc-shaped substrate having a central aperture on remaining portions of said disc-shaped substrate that were not masked in said step of masking;

removing the masking on the inner and outer edge portions of the disc-shaped substrate to form an unmasked substrate;

coating an adhesive layer on the metallic layer and on the unmasked substrate; and adding a protective layer upon the entire surface area of the adhesive layer on said disc-shaped substrate whereby said metallic layer is uncapsulated by said disc-shaped substrate and said protective layer.

2. A method of manufacturing an optically readable, rotatable, record carrier according to claim 1, wherein said step of masking includes using a circular mask and an annular mask.

3. A method of manufacturing an optically readable, rotatable, record carrier for reading by a focussed beam of radiation, comprising the steps of:

masking inner and outer edge portions of a disc-shaped substrate having a central aperture so that no information signal track can be formed by coating at said portions;

coating a metallic layer on the disc-shaped substrate having a central aperture, said metallic layer being formed on portions of said disc-shaped substrate that are not masked by said masking inner and outer edge portions;

unmasking the inner and outer edge portions of the disc-shaped substrate;

coating the unmasked portions of the disc-shaped substrate and the metallic layer with an ultra violet resin; and curing the ultra violet resin by ultra violet light.

4. A method of manufacturing an optically readable, rotatable, record carrier according to claim 3, further comprising the step of printing information related to the information signal recorded on the record carrier on the ultra violet resin.

5. A method of manufacturing an optically readable, rotatable, record carrier according to claim 3, wherein said step of masking comprises using a circular mask and an annular mask.

* * * * *